(12) United States Patent
Müller-Rees et al.

(10) Patent No.: US 6,224,664 B1
(45) Date of Patent: May 1, 2001

(54) MIXTURE COMPRISING PIGMENTS HAVING A LIQUID-CRYSTALLINE STRUCTURE WITH A CHIRAL PHASE AND ITS USE

(75) Inventors: Christoph Müller-Rees, Pullach; Eckhard Hanelt, Geltendorf; Franz-Heinrich Kreuzer, Martinsried; Jürgen Küpfer, München; Horst Leigeber, Oberhaching, all of (DE)

(73) Assignee: Wacker-Chemie GmbH, München (DE)

( * ) Notice: Subject to any disclaimer, the term of this patent is extended or adjusted under 35 U.S.C. 154(b) by 0 days.

(21) Appl. No.: 09/100,199

(22) Filed: Jun. 18, 1998

(30) Foreign Application Priority Data

Jun. 19, 1997 (DE) .............................. 197 26 050

(51) Int. Cl.$^7$ .................................... C09K 19/54
(52) U.S. Cl. ................... 106/493; 106/499; 106/500; 106/505; 106/506; 252/299.5; 528/502
(58) Field of Search .................... 106/493, 499, 106/500, 505, 506; 252/299.5; 528/502

(56) References Cited

U.S. PATENT DOCUMENTS

| 5,362,315 | 11/1994 | Müller-Rees et al. ............... 106/493 |
| 5,683,622 | 11/1997 | Urätzschmar et al. . | |

FOREIGN PATENT DOCUMENTS

| 4240743 | 6/1994 | (DE) . |
| 4408171 | 9/1995 | (DE) . |
| 4416191 | 11/1995 | (DE) . |
| 4418075 | 11/1995 | (DE) . |
| 0686674 | 12/1994 | (EP) . |
| 0685749 | 12/1995 | (EP) . |
| 0724005 | 7/1996 | (EP) . |

OTHER PUBLICATIONS

Derwent Abstract (#95–383808 [50]) corresponding to DE 4416191.
Derwent Abstract (# 96–011612 [02]) corresponding to DE 4418075.
Encyclopedia of polymer science and engineering, vol. 7, pp. 531–544, ed. Marle, Bikales, Ourberger, Menges, Uroschwitz, John Wiley + Sons, Inc. 1987.
Polymer Handbook, 2nd edition, Brandup, Immergent, Wiley + Sons, New York, 1975.
Derwent Abstract (# 95–383808 [50]) corresponding to EP 0 686 674 A1.
Derwent Abstract (# 96–343521 [35]) corresponding to EP 0724 005 A2.
Derwent Abstract (# 95–321444 [42]) corresponding to DE 4408 171 A1.

*Primary Examiner*—Nasser Ahmad
(74) *Attorney, Agent, or Firm*—Brooks & Kushman P.C.

(57) ABSTRACT

The invention relates to mixtures containing pigments which comprise oriented three-dimensionally crosslinked substances having a liquid-crystalline structure with a chiral phase, and to the use of such mixtures. Pigment and matrix are matched to one another in such a way that on application of the mixture at different temperatures to a substrate, the lowest application temperature and highest application temperature differing by at least 10° C. and by not more than 150° C., there are no visually perceptible color differences of the pigmented paint on the substrate after drying.

7 Claims, No Drawings

MIXTURE COMPRISING PIGMENTS HAVING A LIQUID-CRYSTALLINE STRUCTURE WITH A CHIRAL PHASE AND ITS USE

TECHNICAL FIELD

The invention relates to mixtures comprising pigments which comprise oriented three-dimensionally crosslinked substances having a liquid-crystalline structure with a chiral phase, and to the use of such mixtures.

BACKGROUND ART

Pigments comprising oriented three-dimensionally crosslinked substances having a liquid-crystalline structure with a chiral phase are known, for example, from DE 42 407 43 (corresponding to U.S. Pat. No. 5,362,315). These pigments have a color which is dependent on the viewing angle and can be employed in any desired media, such as coating materials, binders or plastics, for example. This is described at length in, for example, EP 0 686 674. A broad field of application is covered by such pigments in connection with the painting of articles such as motor vehicles, for example.

As noted in EP 0 724 005, pigments prepared in accordance with DE 42 40 743 exhibit changes in color if the paint comprising said pigments is processed at different stoving temperatures. This is the case, for example, with motor vehicle finishes.

In accordance with the state of the art, motor vehicles are OEM finished at 130° C., while in the case of subsequent refinishes just 80° C. is tolerated, since constructional elements of the motor vehicle can be damaged at higher temperatures. The color differences between the original finish and the refinish, resulting from the different stoving temperatures, are disadvantageous in that they can be recognized with the naked eye.

In order to solve this problem EP 0 724 005 A2 proposes crosslinking the starting substances specified in DE 42 40 743 for preparing the pigments together with further, color-neutral compounds comprising at least two crosslinkable double bonds. The intention of this is to raise the crosslinking density of the pigments, which is said to lead to greater color stabilities in the case of application in a 130° C. and an 80° C. motor vehicle paint system.

EP 0 724 005 A2 describes pigments prepared in this way which instead of the shift in the wavelength maximum which is commonly observed with the pigments prepared in accordance with DE 42 40 743 feature a shift of just 17–24 nm when comparing room temperature drying of the refinish versus stoving temperature at 130° C. and, at a temperature differential established between 80° C. and 130° C. drying temperatures, just 10–14 nm instead of the customary 20–25 nm. Consequently, by modifying the composition as described, EP 0 724 005 has reduced the wavelength difference by half, but by no means to values of a few nm. It is only at such low wavelength differences that—depending on the spectral sensitivity of the human eye—color differences can no longer be perceived visually. The problem of the deficient color stability of the pigment-containing compositions at different application temperatures therefore continues to exist.

SUMMARY OF THE INVENTION

The invention relates to a mixture comprising a matrix, and pigments which comprise oriented three-dimensionally crosslinked substances having a liquid-crystalline structure with a chiral phase, wherein pigment and matrix are matched to one another in such a way that on application of the mixture at different temperatures to a substrate, the lowest application temperature and the highest application temperature differing by at least 10° C. and by not more than 150° C., there are no visually perceptible color differences of the pigmented paint on the substrate after drying, and where alternatively, the pigments comprising oriented three-dimensionally crosslinked substances having a liquid-crystalline structure with a chiral phase are selected such that their glass transition temperature is either not more than 10° C. higher than the lowest application temperature or is higher than the highest application temperature, or the pigments based on oriented three-dimensionally crosslinked liquid-crystalline substances with a chiral phase are selected such that in the oriented three-dimensionally crosslinked liquid-crystalline substances they comprise no substances which are not chemically fixed, or the pigments comprise said substances which are not chemically fixed only in such low concentrations in the oriented three-dimensionally crosslinked liquid-crystalline substances with a chiral phase that under application conditions only from 0 to 3% by weight, based on the overall weight of the oriented three-dimensionally crosslinked liquid-crystalline substances with a chiral phase can be dissolved out, or the matrix material is selected such that it contains no component which dissolves out substances which are not chemically bonded to the oriented three-dimensionally crosslinked liquid-crystalline substances with a chiral phase of the pigments from the oriented three-dimensionally crosslinked liquid-crystalline substances with a chiral phase, or comprises only such a small amount of such components that under application conditions only from 0 to 3% by weight, based on the overall weight of the oriented three-dimensionally crosslinked liquid-crystalline substances with a chiral phase of the pigments are dissolved out. The mixtures of the invention are particularly suitable for the coloring of substrate surfaces.

DESCRIPTION OF THE PREFERRED EMBODIMENTS

In principle, all pigments comprising oriented three-dimensionally crosslinked substances having a liquid-crystalline structure with a chiral phase are suitable for use in a mixture of the invention. Such pigments are known, for example, from DE 42 40 743 (corresponding to U.S. Pat. No. 5,362,315).

Given the use of arbitrary binders, in each case customary for the respective application, as matrix materials and at a given application temperature, the selection of the pigments which are suitable in each case for the mixture of the invention is made on the basis of the glass transition point of the respective pigments.

The glass transition point of the pigments can be determined in conventional manner in accordance with ENCYCLOPEDIA OF POLYMER SCIENCE AND ENGINEERING, Vol. 7, pp. 531–544, ed. H. F. Mark, N. M. Bikales, C. G. Overberger, G. Menges, J. I. Kroschwitz; John Wiley & Sons, Inc. 1987. It is usually defined as the inflection point or midpoint of a broad glass transition range, whose breadth for liquid-crystalline polymers is typically a few 10° C. The difference between the temperature which arises in the course of application and the glass transition point essentially determines the time constant with which the color changes on application. Depending on the desired temperature range within which color stability is required, the selection of the pigments is made such that either pigments are selected whose glass transition point is not more than 10° C. higher than the lowest temperature which arises in the course of application of the mixture, or such that pigments are selected whose glass transition point is higher than the highest temperature occurring in the course of application of the mixture.

For the purposes of the present invention the term application temperature means the stoving temperature or drying temperature of the mixture of the invention on the surface of the substrate that has been coated with the mixture.

It is common knowledge with three-dimensionally crosslinked systems that complete reaction of all functional groups which can be incorporated into the network is not always able to take place under all reaction conditions, so that a proportion of such groups is present in unincorporated form in the network. Likewise, chemical reactions generally do not proceed without the formation of byproducts, so that in some circumstances the liquid-crystalline starting material may also include groups which contain no chemically reactive, polymerizable units which hence can be incorporated into the three-dimensional network that is to be constructed.

Under certain conditions, such molecules can be dissolved out of the network by, for example, binder constituents, additives or solvents having chemical affinity for the respective type of molecule, which may be present, for example, in the binder matrix or polymer matrix.

Such dissolutive removal, or leaching, of substances which are not bound in the liquid-crystalline network, in amounts of greater than 3% by weight based on the liquid-crystalline material, must be avoided in the combination of pigment and matrix material of the invention in so far as the criteria relating to the glass transition temperature are not met.

Preferably, the matrix material is one which does not itself possess any solvent properties for the substances present in the liquid-crystalline network and/or any swelling properties with respect to the liquid-crystalline network of the pigments, or which contains no liquids or mixtures of liquids which act as solvents for the substances present in the liquid-crystalline network and/or possess no swelling properties with respect to the liquid-crystalline network of the pigments which are present in the mixture of the invention.

Suitable matrix materials which contain little if any of components which dissolve the substances not incorporated into the polymeric network of the liquid-crystalline pigments out of the helical layer structure are preferably all binders or mixtures of binders whose solubility parameters (Polymer Handbook, 2nd edition, ed. J. Brandrup, E. H. Immergut, J. Wiley & Sons, New York, 1975) differ by at least 1.5 ($J^{0.5}$ $cm^{-1.5}$) units from the solubility parameter of the liquid-crystalline network of the pigment. This applies to solvent-containing and solvent-free binders.

Examples of combinations of matrix material and pigments which are in accordance with the invention are given below:

In application of mixtures of the invention to substrates in a temperature range from a minimum of 80° C. to a maximum of 130° C., wherein pigments having a glass transition point of less than 80° C. or greater than 130° C. are present and wherein for pigments comprising Si-containing or Si-free materials the matrix materials may be selected from the group consisting of alkyd, melamine, polyurethane, urea, phenolic, vinyl acetate, cellulose nitrate, silicone and polyester resins and combinations thereof.

The mixtures of the invention can be used with preference in the following fields: finishing, printing inks, plastics, and powder coatings. The text below indicates by way of example processes which use mixtures of the invention for the coating of substrate surfaces by, for example, spray techniques, screen printing, knife coating, roller coating, brush coating, and powder coating.

The mixtures of the invention are preferably employed in said processes at temperatures between 10° C. and 300° C.

The invention additionally relates to finishes, printing inks, plastics and powder coatings to be applied, for example, to metallic and ceramic substrates, and also wood and plastics, comprising a mixture of the invention.

The invention relates in addition to means of transport, such as road vehicles, to rail vehicles or aircraft, to household articles, such as white goods, brown goods or furniture, to sports equipment, papers, textiles, nonwovens, leather, securities, banknotes or credit cards which are coated with a mixture of the invention.

The examples which follow illustrate the invention.

EXAMPLE 1

Pigment Comprising Liquid-crystalline Silicone 170 ml of toluene were added to 71 g (0.13 mol) of cholesteryl 4-allyloxybenzoate. While stirring the suspension it was brought to boiling, and some of the toluene was distilled off azeotropically. After the mixture had cooled to about 60° C., 21 g (0.35 mol) of 1,3,5,7-tetramethylcyclotetrasiloxane and 0.53 g of a 0.5% strength by weight solution of cyclooctadienyldichloroplatinum catalyst (Wacker-Chemie GmbH, 81737 Munich DE) in methylene chloride were added. The reaction solution was heated to 85° C. and stirred for 1 hour. After it had cooled to 40° C., 80 g (0.194 mol) of 4-(4-methacryloyloxybutoxy)phenyl 4-allyloxybenzoate, 0.09 g (0.4 mmol) of BHT and 1.06 g of a 0.5% strength by weight solution of cyclooctadienyldichloroplatinum catalyst in methylene chloride were added. The solution was subsequently heated to about 75° C. and stirred for 1.5 hours. After it had cooled to 20° C., 43.0 g (104 mmol) of 4-(4-methacryloyloxybutoxy)phenyl 4-allyloxybenzoate and 0.09 g of BHT were added. Subsequently, 5.36 g of the photoinitiator Irgacure 507® (Ciba-Geigy, Basel, Switzerland) were added.

The solution was freed from the solvent by means of a thin-film evaporator at a pressure of 25 mbar and a heating jacket temperature of 90° C. (residual content <1% by weight of toluene).

The liquid crystal obtained in this way has a glass transition at about −8° C. The clearing temperature (peak) from cholesteric to isotropic is at 103° C. The viscosity at 90° C. is about 700 mPas.

Thin films of the material, oriented at 90° C., UV-crosslinked and then cooled to 20° C., show a reflection wavelength of 540 nm. The crosslinked material has a glass transition temperature of 72° C. The fraction extractable from the crosslinked material by treatment with chloroform is 8% by weight.

The thin films of the material were processed to pigments by grinding them in a universal laboratory mill. Grinding for 15 minutes gave a pulverulent fraction which was subsequently screened using an analytical sieve having a mesh size of 50 µm.

These pigments were incorporated into a conventional alkyd-melamine resin binder system (obtainable commercially under the designation Sacolyd F 410/Sacopal M 110 from Kolms Chemie, Krems, AT) for automotive refinishing. The viscosity of the binder system was adjusted with a diluent (mixture of aromatic hydrocarbons and methyl isobutyl ketone) to a flow time of about 80 s from a DIN 4 flow cup.

The resulting pigment-binder system was knife-coated onto black/white paper (BYK Gardner) with the aid of a film-drawing applicator (from Erichsen) in a wet film thickness of 120 μm. The paper was then cut into a number of strips which were each dried for 1 h at either 80° C. or 130° C. The strips obtained in this way were then illuminated with white light at 45°, and the light reflected at 25° was measured spectrometrically. The resulting measurements (reflection maxima) are listed in the table below, along with the glass transition temperature of the pigments and the fractions extractable from the crosslinked material by treatment with chloroform.

| Stoving temperatures | Wavelength maxima | Wavelength difference of the maxima | Glass transition temperature of the pigment | Extract-able fractions |
|---|---|---|---|---|
| 80° C. | 501 nm | | 72° C. | 8% by weight |
| 130° C. | 503 nm | +2 nm | | |

Comparative Example 1

The procedure of Example 1 was carried out for pigments prepared in accordance with EP 0 686 674 Example 4, with the following results:

| Stoving temperatures | Wavelength maxima | Wavelength difference of the maxima | Glass transition temperature of the pigment | Extract-able fractions |
|---|---|---|---|---|
| 80° C. | 481 nm | | 82° C. | 15% by weight |
| 130° C. | 470 nm | −11 nm | | |

EXAMPLE 2

A liquid-crystalline material was prepared in accordance with DE 44 08 171 A1 as follows: components K5, K6, K8, K9 (Example 85, mixture 33) and components K1, K2, K4, K5 (Example 92, mixture 40) were mixed in equal proportions. 10% by weight of component K10 (Example 78, mixture 26) were added to this mixture, and again the components were mixed. This mixture was used to prepare pigments as described in EP 0 686 674 A1 Example 1, with the temperature of orientation of the liquid-crystalline material being 50° C. The pigments were processed, stoved and measured as in Example 1.

| Stoving temperatures | Wavelength maxima | Wavelength difference of the maxima | Glass transition temperature of the pigment | Extract-able fractions |
|---|---|---|---|---|
| 80° C. | 434 nm | | 60° C. | 8% by weight |
| 130° C. | 432 nm | −2 nm | | |

EXAMPLE 3

1 g of the pigments prepared in accordance with EP 0 686 674 (Example 3) was incorporated into a screen printing binder system, which is based on a solution of acrylate resins and cellulose derivatives in acetate-cQntaining solvents (Noristar PG from Pröll, Weissenburg DE) by stirring for 5 minutes and the formulation was knife-coated as described in Example 1 onto black/white paper (BYK Gardner). The paper was cut into sections which were each dried in a drying cabinet at 20° C. or 80° C. for 1 h. The samples were then measured as in Example 1. The result is given in the following table:

| Drying temperatures | Wavelength maxima | Wavelength difference of the maxima |
|---|---|---|
| 20° C. | 578 nm | — |
| 80° C. | 578 nm | 0 nm |

Comparative Example 2

The procedure described in Example 3 was repeated except that a non-oxidatively drying screen printing binder system was used which comprises, inter alia, relatively large proportions of aromatic constituents (Seristar SC from Sericol, Mühlheim/Ruhr DE). The viscosity was adjusted with a diluent (ZC 530, from Sericol) to a flow time of 95 s from a DIN 4 cup. After drying under the conditions indicated in Example 3, the following wavelength maxima were obtained:

| Drying temperatures | Wavelength maxima | Wavelength difference of the maxima |
|---|---|---|
| 20° C. | 573 nm | — |
| 80° C. | 549 nm | 24 nm |

What is claimed is:

1. A composition comprising a matrix, and pigments comprising oriented three-dimensionally crosslinked substances having a liquid-crystalline structure with a chiral phase, wherein pigment and matrix are matched to one another in such a way that on application of the mixture at different temperatures to a substrate, the lowest application temperature and the highest application temperature differing by at least 10° C. and by not more than 150° C., there are no visually perceptible color differences of the pigmented paint on the substrate after drying, said compositions selected from the group consisting of:
    a) a matrix and pigments comprising oriented three-dimensionally crosslinked substances having a liquid-crystalline structure with a chiral phase selected such that their glass transition temperature is either not more than 10° C. higher than the lowest application temperature or is higher than the highest application temperature;
    b) a matrix and pigments based on oriented three-dimensionally crosslinked liquid-crystalline substances with a chiral phase selected such that in the oriented three-dimensionally crosslinked liquid-crystalline substances they comprise no substances which are not chemically fixed;
    c) a matrix and pigments comprising substances which are not chemically fixed only in such low concentrations in the oriented three-dimensionally crosslinked liquid-crystalline substances with a chiral phase that under application conditions only from 0 to 3% by weight, based on the overall weight of the oriented three-dimensionally crosslinked liquid-crystalline substances with a chiral phase can be dissolved out by components of the matrix;
    d) a matrix and pigment(s) wherein the matrix material is selected such that it contains no component which dissolves out substances which are not chemically bonded to the oriented three-dimensionally crosslinked liquid-crystalline substances with a chiral phase of the pigments from the oriented three-dimensionally crosslinked liquid-crystalline substances with a chiral phase; and e) a matrix and pigment wherein said matrix comprises only such a small amount of components which are capable of dissolving substances not chemically bonded to the oriented three-dimensionally crosslinked liquid-crystalline substances with a chiral phase that under application conditions only from 0 to 3% by weight, based on the overall weight of the oriented three-dimensionally crosslinked liquid-crystalline substances with a chiral phase of the pigments are dissolved out.

2. The composition as claimed in claim 1, which comprises a matrix material which does not itself possess any solvent properties for the substances present in the liquid-crystalline network or any swelling properties with respect to the liquid-crystalline network of the pigments; or which contains no liquids or mixtures of liquids which act as solvents for the substances present in the liquid-crystalline network or possess swelling properties with respect to the liquid-crystalline network of the pigments.

3. The mixture as claimed in claim 1, wherein the matrix materials are selected from the group consisting of alkyd, melamine, polyurethane, urea, phenolic, vinyl acetate, cellulose nitrate, silicone, and polyester resins, and combinations thereof.

4. The mixture as claimed in claim 2, wherein the matrix materials are selected from the group consisting of alkyd, melamine, polyurethane, urea, phenolic, vinyl acetate, cellulose nitrate, silicone, and polyester resins, and combinations thereof.

5. A finish, printing ink, plastic or powder coating comprising the composition of claim 1.

6. A finish, printing ink, plastic or powder coating comprising the composition of claim 2.

7. A finish, printing ink, plastic or powder coating comprising the composition of claim 3.

* * * * *